March 17, 1931.                    E. H. HAMMOND                    1,796,600
                              FENDER CURTAIN FOR AUTOMOBILES
                                   Filed Aug. 25, 1927
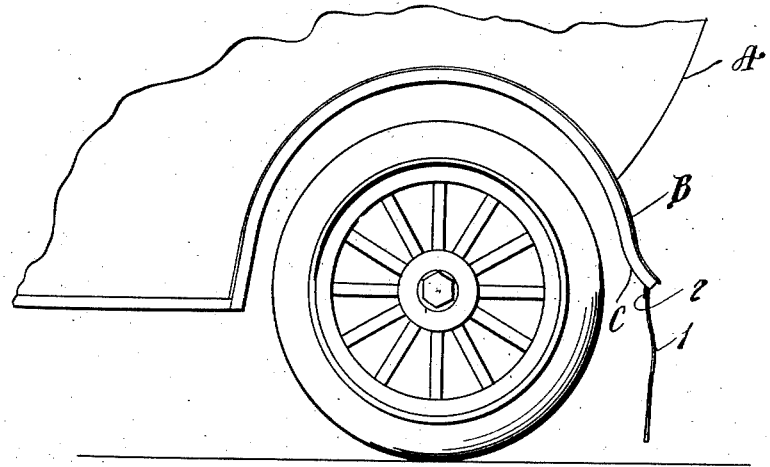
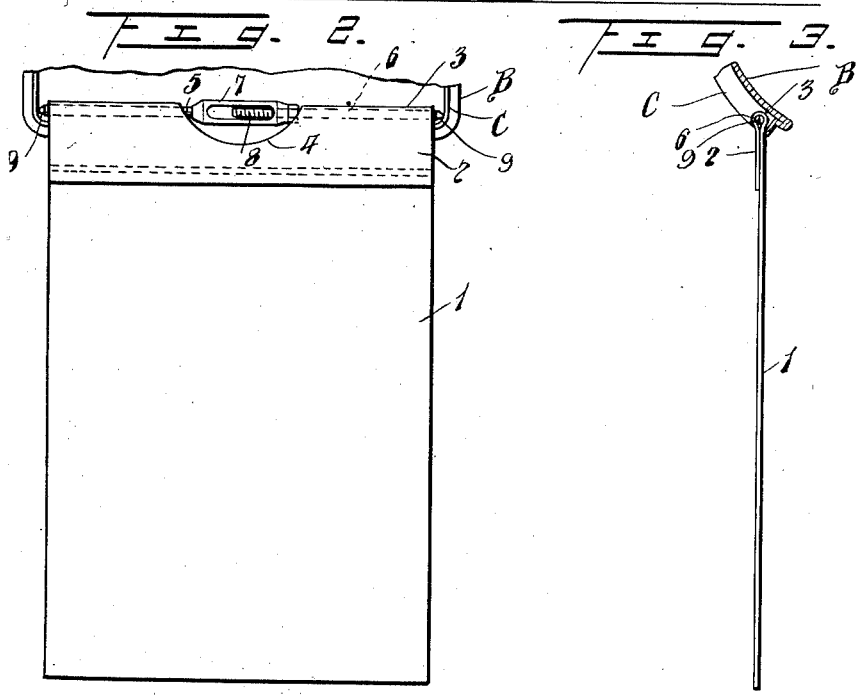
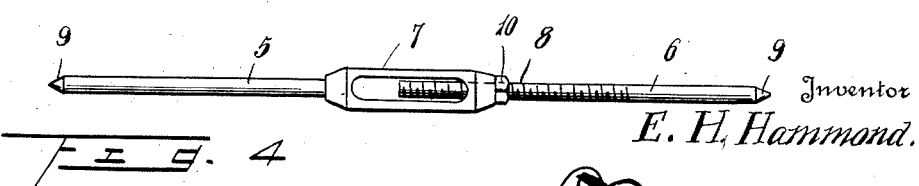
Inventor
E. H. Hammond.
By
Attorney Patented Mar. 17, 1931

1,796,600

UNITED STATES PATENT OFFICE

ELMER H. HAMMOND, OF LACONIA, NEW HAMPSHIRE, ASSIGNOR TO PERSONS-MAJESTIC MANUFACTURING COMPANY, OF WORCESTER, MASSACHUSETTS, A CORPORATION OF MASSACHUSETTS

FENDER CURTAIN FOR AUTOMOBILES

Application filed August 25, 1927. Serial No. 215,414.

The invention relates to a removable and replaceable curtain for the fenders of automobiles to prevent splashing the rear of the automobile with mud, tar, oil, etc., that may be thrown up by the rear wheels of the vehicle when in operation, and has for its object the provision of a curtain supported on an expansible holder that is adapted to terminally engage the flanges on an automobile fender to hold the curtain in place.

One embodiment of the invention resides in the provision of a curtain for the purpose stated having its upper end provided with a tube to receive suspending rods connected by a turn buckle located in a recess in the upper portion of the curtain, the outer ends of the rods being tapered and adapted to be engaged with the flanges of an automobile fender to hold the curtain suspended at the rear of the driving wheels for the purpose stated.

The invention will be described in detail hereinafter and will be found illustrated in the accompanying drawings, in which Figure 1 is a side view of a portion of a motor vehicle showing the improved curtain in place, Figure 2 is a view in elevation of the curtain showing it attached to the fender, Figure 3 is an edge view of the curtain showing a portion of the fender in section, and Figure 4 is a view on an enlarged scale of the attaching member.

In the drawings similar reference characters are used to designate corresponding parts in the several views.

In Figure 1 an automobile is suggested at A having a fender B with the usual depending flanges C to which is secured the improved curtain designated 1. The curtain may be made of any suitable material such for instance as sheet metal, or any suitable fabric, as for instance, canvas, oil cloth, or the like, and has its upper edge returned and secured to the body of the member as shown at 2 to form a tube 3. The upper portion of the curtain 1 is cut out or recessed as shown at 4, and the suspending member for the curtain comprises rods 5 and 6, which are engaged in the tubular portion 3 at opposite sides of the recess 4. 7 indicates a turn buckle that is rotatably mounted on the rod 5 in engagement with threads 8 on the rod 6, said turn buckle being adapted to adjust the length of the suspending member to suit the width of the fender B and to actuate the tapered ends 9 of said rods 5 and 6 into engagement with the flanges C of the fender to hold the curtain in suspended relation with the fender, as indicated in Figure 1. 10 indicates a jamb nut to lock the turn buckle 7 in adjusted relation when the rods 5 and 6 are in engagement with the fender.

In use it will be apparent that when the curtain is in the position shown in Figure 1 any mud, tar, or other matter picked up by the driving wheels will be thrown against the curtain and prevented from being thrown on the rear of the car or to the rear of the automobile and it will be furthermore understood that the curtain may be removed and replaced if desired, and that the over-all length of the extensible curtain supporting member may be readily adjusted to fit between the flanges of fenders of different widths.

What is claimed is:—

1. In combination with an automobile fender having depending flanges adjacent to its side edges, a curtain having its upper edge returned to form a tube, the returned portion of said curtain having a cut out portion dividing the fold thereof into two sections, a supporting member for said curtain including a rod engaging in each section of said fold and adapted to engage the flanges aforesaid and a turn buckle engaging adjacent ends of the rods to adjust the length of said supporting member and hold the curtain clamped between said flanges, said turn buckle being located in said cut out portion to permit actuation thereof for the purpose stated.

2. A splash guard for vehicles having a mud guard with substantially parallel walls, comprising, a member adapted to extend between and to forcibly engage the inner sides of said walls, and a boot supported upon said member 3. A splash guard for a vehicle fender having spaced depending flanges, comprising a longitudinally extensible member adapted to be adjusted between the said fender flanges with its ends forcibly engaging opposed faces of said flanges and a boot or flap supported on said member intermediate its ends.

4. The combination with a vehicle fender having spaced downwardly extending edge flanges, of means for supporting a boot or flap from said fender, within said flanges, comprising a holder longitudinally extensible between said flanges with terminal portions of said holder forcibly maintained in engagement with opposed faces of said flanges.

In testimony whereof I affix my signature.

ELMER H. HAMMOND.